April 27, 1971  K. H. RATTENBURY  3,576,651
POLYVINYL CHLORIDE CONTAINERS WITH POLYMERIC
PHOSPHITE STABILIZERS
Filed Aug. 6, 1968
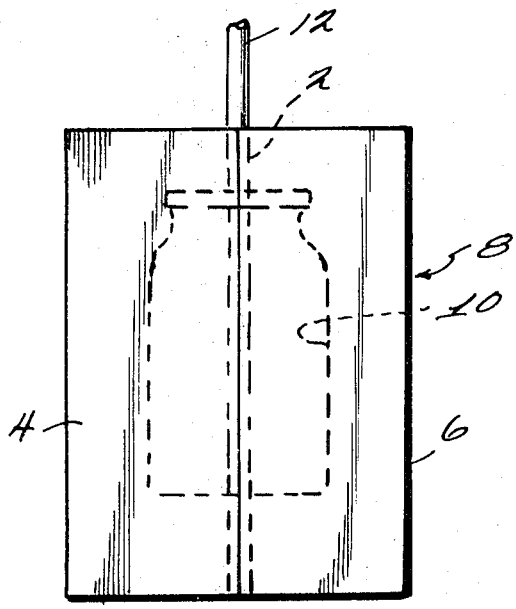
INVENTOR
KENNETH H. RATTENBURY
BY
ATTORNEYS

United States Patent Office 3,576,651
Patented Apr. 27, 1971

3,576,651
POLYVINYL CHLORIDE CONTAINERS WITH
POLYMERIC PHOSPHITE STABILIZERS
Kenneth H. Rattenbury, Morgantown, W. Va., assignor to
Western Chemical Corporation, New York, N.Y.
Filed Aug. 6, 1968, Ser. No. 750,622
Int. Cl. B65b 25/06; C08d 7/10
U.S. Cl. 99—174
9 Claims

ABSTRACT OF THE DISCLOSURE

A clear container is made of rigid polyvinyl chloride containing as a stabilizer a polymeric phosphite having the recurring structural unit

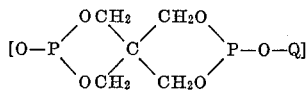

where Q is the divalent residue of a hydrogenated dihydric phenol.

---

The present invention relates to novel rigid polyvinyl chloride resin containers.

Rigid polyvinyl chloride resins today are normally stabilized with tin containing stabilizers in order to get both stability and good clarity. Tin containing stabilizers, however, exhibit toxic properties. Of the many known stabilizers for vinyl chloride resins only a few combine nontoxicity with adequate stability for rigid vinyl chloride resins while at the same time providing a clear, colorless product suitable for food use.

Accordingly, it is an object of the present invention to prepare stabilized rigid vinyl chloride resin bottles having optimum clarity.

Another object is to prepare such bottles which are suitable for food uses.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming rigid vinyl chloride resin bottles utilizing as a stabilizer polymeric phosphites having the recurring structural unit

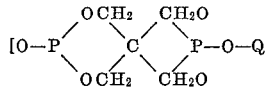

where Q is the divalent residue of a completely hydrogenated dihydric phenol. Preferably Q is the residue of 4,4'-isopropylidene dicyclohexanol (hydrogenated bisphenol A) but Q can also be the residue of 1,4-cyclohexane dimethanol, 4,4'-methane dicyclohexanol, etc.

The stabilizers are solids, having molecular weights ranging from 1000 upward to 30,000 or higher.

The prosphite stabilizers of the present invention are conveniently prepared by reacting approximately 1 mole of diphenyl pentaerythritol diphosphite with about 1 mole of hydrogenated bisphenol A or the like. The molecular weight can be regulated by careful adjustment of the exact amount of hydrogenated bisphenol A employed.

It will be realized that a portion of the hydrogenated dihydric phenol can be replaced by a dihydric phenol, e.g., bisphenol A, di(4-hydroxyphenyl) sulfone, di(4-hydroxyphenyl) methane, hydroquinone or the like or by a glycol such as dipropylene glycol, diethylene glycol, neopentyl glycol, or ethylene glycol but in such case the properties of the polymeric phosphite stabilizer are impaired in proportion to the amount of replacement.

A particularly preferred stabilizer is Weston PP442 phosphite, a solid polymeric phosphite having the recurring structural unit

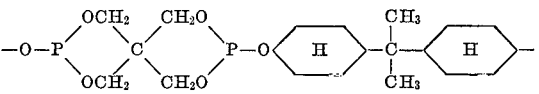

a molecular weight of 2500–3000, M.P. 65° C. (minimum), phosphorus 12.0–12.4%, percent hydroxyl calculated as phenol 2.0 (maximum).

The stabilizers employed are solids. This is an advantage in forming mixtures with the rigid vinyl chloride resins.

The invention will be best understood in connection with the drawings wherein:

FIG. 1 is a view showing the blow molding of a bottle according to the invention; and FIG. 2 is a plan view of a bottle prepared according to the invention.

Referring more specifically to the drawing, a parison 2 is extruded of a rigid polyvinyl chloride containing as a stabilizer 2 parts of calcium stearate and 0.5 part of the polymeric pentaerythritol hydrogenated bisphenol A phosphite available commercially as Weston PP442 phosphite. The parison is then positioned between the sections 4 and 6 of blow mold 8. The mold sections 4 and 6 are then engaged as shown in FIG. 1 to form the mold 8 having a cavity 10 of a shape corresponding to the bottle to be formed.

After closing the mold 8, high velocity air is introduced through nozzle 12 at about 40 p.s.i. into the parison 2 to expand it to fill the die cavity 10. The parison still hot from the extrusion had a temperature of about 350° F. at the commencement of the blowing operation In the blowing of the parison tof orm the bottle there was a lateral stretching of about 50%.

The finished blow molded bottle 14 is shown in FIG. 2. The bottle was water white and perfectly clear. The bottle was filled with salad dressing 16 and closed with cap 18. The cap can be of any conventional type, e.g. metal or plastic such as polyvinyl chloride, melamine-formaldehyde, polyethylene, polypropylene.

The blow molded bottles are characterized by being stretch oriented at least 25% in at least one direction. The parison can be stretched longitudinally during its formation. In such case, the finished bottle is biaxially oriented. The stretch orientation is usually between 25 and 200% although it can be even greater.

It is also possible to injection mold bottles of vinyl chloride resins stabilized according to the invention although preferably blow molded bottles are employed.

The blow molded bottles of the present invention can be used to package beer, wine, liquor, milk, salad dressing, baby food, peanuts, popcorn, flour, cake mix, soup, chicken, meat sticks, instant coffee, regular ground coffee, dehydrated vegetables and fruits, olives, cherries, beets, sliced peaches, detergents (both liquid and powder types), perfume.

The stabilized polyvinyl chloride bottles of the present invention are the first clear, polyvinyl chloride bottles which are safe as containers for foods.

The rigid vinyl chloride resins are preferably of the kind known as Type I, i.e. polyvinyl chloride and copolymers of vinyl chloride with a minor amount, e.g. up to 15% of a copolymerizable monomer such as vinyl acetate, vinylidene chloride, alkyl maleates and fumarates, e.g. dibutyl fumarate and diethyl maleate, vinyl butyrate, butyl acrylate, methyl acrylate and other alkyl acrylates, methyl methacrylate and other alkyl methacrylates, styrene, vinyl ethyl ether and other vinyl ethers, acrylonitrile. Typical copolymers include vinyl chloride-vinyl acetate (97:3 and also 85:15), vinyl chloride-vinyl acetate-maleic anhydride (86:13:1), vinyl chloride-vinylidene chloride (95:5), vinyl chloride-acrylonitrile (90:10).

There can also be employed Type II rigid vinyl chloride resins which are mixtures of polyvinyl chloride with 5 to 20% of Type N rubbers, e.g. a mixture of 90% polyvinyl chloride with 10% rubbery butadiene-acrylonitrile copolymer.

The solid stabilizers of the present invention are normally milled into the rigid polyvinyl chloride at 150–155° C., although the temperature can be as high as 175–185° C., using a conventional high speed mill, e.g. 270–300 ft./minute peripheral speed.

It is critical to use hydrogenated bisphenol A. If this component is replaced in part by polypropylene glycol, for example, the stability of the rigid polyvinyl chloride goes down.

As previously indicated, the stabilizers of the present invention can be used alone with the rigid vinyl chloride resin. There are normally used 0.5–5% of the stabilizer based on the rigid vinyl chloride resin although improvement in stability is noted with as little as 0.1% or as much as 10% of the polymeric phosphite stabilizer based on the resin.

It is frequently desirable to include in the composition conventional additives, e.g. 0.5–2% of a mold lubricant such as stearic acid, paraffin wax, mineral oil, butyl stearate, or polydimethyl siloxane (or other silicone lubricants).

For best results it is also sometimes desirable to include 0.1–5% based on the rigid vinyl chloride resin of polyvalent higher fatty acid salts such as calcium stearate, zinc stearate calcium 2-ethylhexoate, calcium octoate, calcium oleate, calcium ricinoleate, calcium myristate, calcium palmitate, calcium laurate, barium laurate, barium stearate, magnesium stearate, cadmium laurate, cadmium octoate, cadmium stearate, sodium stearate, lead stearate, aluminum stearate, etc. Of course for food and pharmacological uses the salt should be non-toxic. Salts such as barium nonylphenolate, cadmium octylphenolate and other conventional phenol salt stabilizers can also be included.

It is also frequently desirable to include 0.1–5% based on the rigid vinyl chloride resin of an epoxy compound. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins (epichlorhydrin-diphenylolpropane resins), phenoxy-propylene oxide, butoxy-propylene oxide, epoxidized neopentylene oleate, glycidyl epoxystearate, epoxidized alpha-olefins, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxynaphthalene, epoxidized linseed oil fatty acids, allyl glycidyl ether, butyl glycidyl ether, 4-(2,3-epoxypropoxy) acetophenone, mesityl oxide epoxide, 2-ethyl-2-propyl glycidamide, glycidyl ethers of glycerine, pentaerythritol and sorbitol and 3,4-epoxycyclohexand-1, 1-dimethanol bis-9,10-epoxystearate.

EXAMPLE 1

| | Parts |
|---|---|
| Type I rigid polyvinyl chloride (Vinylite QYSJ) | 100 |
| Calcium-zinc stearate (1:1 mixture) | 2 |
| Epoxidized soya bean oil (EPO) | 5 |
| Stearic acid (processing aid) | 0.5 |
| Weston PP 442 phosphite | 0.5 |

This mixture was extruded in the form of a parison and a bottle blow molded therefrom in the manner described previously. The bottle was water white and perfectly clear. Samples 125 mil thick of the formulation used in Example 1 were milled at 150–155° C. The samples were resistant to discoloration for considerably longer periods of time than when using diphenyl isooctyl phosphite in the same formulation.

The bottles of the present invention contained no toxic ingredients and were suitable for food uses. Also, no green or blue toners were needed to mask undesired color.

While reference has been made to clear, colorless containers it will be realized that this does not exclude the subsequent application of lettering or decoration to either the inside or outside of the container.

What is claimed is:
1. A clear container made of rigid polyvinyl chloride containing as a stabilizer a polymeric phosphite consisting essentially of the recurring structural unit

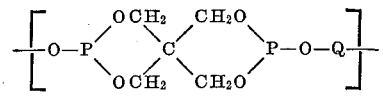

wherein said polymeric phosphite has a molecular weight of 1000 to 30,000, where Q is the divalent residue of a hydrogenated dihydric phenol, said polymeric phosphite being present in an amount of .1–10% based on said polyvinyl chloride.

2. A container according to claim 1 wherein Q is

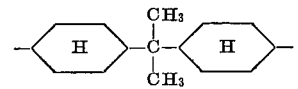

3. A container according to claim 2 wherein the composition also includes a nontoxic higher fatty acid salt as a stabilizer.
4. A container according to claim 3 wherein the fatty acid salt is a zinc or calcium salt.
5. Food packaged in the container of claim 3.
6. A container according to claim 5 wherein the food packaged is chicken.
7. Food packaged in the container of claim 3, said container being in the form of a clear, blow molded bottle.
8. Food packaged in the container of claim 7 wherein the bottle is characterized by being stretch-oriented at least 25% in one direction.
9. A container according to claim 3 wherein the polymer has a molecular weight of 2500–3000.

References Cited

UNITED STATES PATENTS

| | | | |
|---|---|---|---|
| 3,075,940 | 1/1963 | Pazinski | 260—45.7X |
| 3,225,001 | 12/1965 | Darsa | 260—45.7X |
| 3,264,247 | 8/1966 | Friedman | 260—45.7X |
| 3,392,032 | 7/1968 | Lines | 260—45.7X |
| 3,400,088 | 9/1968 | Bourgau | 260—45.7X |

FOREIGN PATENTS

| 907,877 | 10/1962 | Great Britain | 260—45.7 |
|---|---|---|---|

FRANK W. LUTTER, Primary Examiner

R. HALPER, Assistant Examiner

U.S. Cl. X.R.

215—1.5; 260—45.7

UNITED STATES PATENT OFFICE
CERTIFICATE OF CORRECTION

Patent No. 3,576,651    Dated April 27, 1971

Inventor(s) Kenneth H. Rattenbury

It is certified that error appears in the above-identified patent and that said Letters Patent are hereby corrected as shown below:

The name of the assignee should be corrected as follows

"Western Chemical Corporation" should read

--Weston Chemical Corporation--.

Signed and sealed this 12th day of October 1971.

(SEAL)
Attest:

EDWARD M. FLETCHER, JR.　　　　ROBERT GOTTSCHALK
Attesting Officer　　　　　　　　Acting Commissioner of Patents